US010754186B2

(12) United States Patent
Tan et al.

(10) Patent No.: US 10,754,186 B2
(45) Date of Patent: Aug. 25, 2020

(54) DISPLAY DEVICE AND DISPLAY METHOD

(71) Applicant: BOE TECHNOLOGY GROUP CO., LTD., Beijing (CN)

(72) Inventors: Jifeng Tan, Beijing (CN); Wei Wang, Beijing (CN); Xiandong Meng, Beijing (CN); Xianqin Meng, Beijing (CN); Jian Gao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/201,103

(22) Filed: Nov. 27, 2018

(65) Prior Publication Data

US 2019/0302515 A1    Oct. 3, 2019

(30) Foreign Application Priority Data

Mar. 30, 2018  (CN) .......................... 2018 1 0298907

(51) Int. Cl.
*G02F 1/1335* (2006.01)
*G02F 1/1343* (2006.01)
(Continued)

(52) U.S. Cl.
CPC ....... *G02F 1/133504* (2013.01); *G02B 6/005* (2013.01); *G02B 6/0031* (2013.01);
(Continued)

(58) Field of Classification Search
CPC .............. G02B 27/0172; G02B 27/017; G02B 27/4205; G02B 27/30; G02B 27/425; G02B 6/0016; G02B 6/0038; G02B 6/005; G02B 6/0035; G02B 6/0031; G02B 6/0068; G02B 6/0055; G02B 6/0011; G02B 6/00; G02B 6/0028; G02B 6/29316; G02B 6/42; G02B 6/0033; G02B 6/0073; G02B 5/18; G02B 5/1866; G02B 30/26; G02F 1/133615; G02F 1/292; G02F 1/13342;
(Continued)

(56) References Cited

U.S. PATENT DOCUMENTS

| 2009/0129116 | A1* | 5/2009 | Kim ..................... G02B 6/0035 362/606 |
| 2009/0190072 | A1* | 7/2009 | Nagata ................. G02B 6/0028 349/96 |
| 2018/0227576 | A1* | 8/2018 | Fattal ................... G02B 6/0035 |

FOREIGN PATENT DOCUMENTS

CN            106292051 A        1/2017

* cited by examiner

*Primary Examiner* — Thoi V Duong
(74) *Attorney, Agent, or Firm* — Brooks Kushman P.C.

(57) ABSTRACT

A display device and a display method are provided. The display device includes: a first substrate; a light guide plate opposite to the first substrate; a grating layer including gratings, on the light guide plate and at a side of the light guide plate facing towards the first substrate, wherein each grating corresponds to one pixel; and a light source at a lateral surface of the light guide plate parallel to a light emergent direction of the display device, wherein the light source includes monochromatic light emitting components and an optical component, lights of different colors emitted by the monochromatic light emitting components are incident into, via the optical component, the light guide plate at different incident angles and are emergent from the gratings, and the incident angles are greater than a total reflection angle of the light guide plate.

20 Claims, 6 Drawing Sheets

(51) Int. Cl.
*F21V 8/00* (2006.01)
*G02F 1/1337* (2006.01)
*G02F 1/137* (2006.01)

(52) U.S. Cl.
CPC ........... *G02B 6/0068* (2013.01); *G02F 1/137*
(2013.01); *G02F 1/1337* (2013.01); *G02F 1/13439* (2013.01); *G02F 1/134309* (2013.01);
*G02F 2001/133565* (2013.01); *G02F 2201/121* (2013.01); *G02F 2201/123* (2013.01); *G02F 2201/305* (2013.01)

(58) Field of Classification Search
CPC ........... G02F 1/133602; G02F 1/13306; G02F 1/133504; G02F 1/133621; G02F 1/1326; G02F 1/1335; G02F 1/133553; G02F 1/1336; G02F 1/1343; G02F 1/134309; G02F 1/13439; G02F 1/155; G02F 1/225; G02F 1/133509; G02F 1/133512; G02F 1/133524; G02F 1/1337; G02F 1/1362; G02F 1/136286; G02F 1/133603; G02F 1/133604; G02F 1/133605; G02F 1/137; G02F 2201/305; G02F 2201/307; G02F 2201/30; G02F 2201/123; G02F 2201/121; G02F 2201/302; G02F 2001/133606; G02F 2001/133565; G02F 2001/133623; G02F 2001/133607; G02F 2001/133622; G09G 3/3406; G09G 2300/0452; G09G 2320/068; G09G 3/003; G09G 3/3607; H01L 27/3211; H01L 27/322; H01L 27/3244; H01L 51/5203; H04N 13/32; H04N 13/324
See application file for complete search history.

DISPLAY DEVICE AND DISPLAY METHOD

CROSS-REFERENCE TO RELATED APPLICATION

This application claims priority to Chinese Patent Application No. 201810298907.9 filed on Mar. 30, 2018, which is incorporated herein by reference in its entirety.

TECHNICAL FIELD

The present disclosure relates to the field of display technology, and in particular, relates to a display device and a display method of the display device.

BACKGROUND

With development of display technology, a resolution of a display device is higher than before. For example, the resolution of a display device reaches 3000 PPI (Pixel Per Inch).

SUMMARY

A display device and a display method of the display device are provided in the present disclosure.

In a first aspect, a display device is provided in the present disclosure and includes a first substrate; a light guide plate opposite to the first substrate; a grating layer on the light guide plate, wherein the grating layer is at a side of the light guide plate facing towards the first substrate, the grating layer includes a plurality of gratings, and each gating of the plurality of gratings corresponds to one pixel of the display device; and a light source at a lateral surface of the light guide plate, the lateral surface being parallel to a light emergent direction of the display device, wherein the light source includes a plurality of monochromatic light emitting components and an optical component, lights of different colors emitted by the plurality of monochromatic light emitting components are incident into, via the optical component, the light guide plate at different incident angles and are emergent from the plurality of gratings, and the different incident angles are greater than a total reflection angle of the light guide plate.

Optionally, the display device further includes a liquid crystal layer and a control electrode between the first substrate and the light guide plate, wherein the liquid crystal layer is configured to change, in response to a driving voltage applied to the control electrode, an effective refractive index n of the liquid crystal layer to the lights emergent from the plurality of gratings between ne to no, ne is a refractive index of the liquid crystal layer to an extraordinary light, no is a refractive index of the liquid crystal layer to an ordinary light, where no≤n≤ne.

Optionally, each grating of the plurality of gratings makes the lights of different colors incident into the light guide plate to be emergent out at a same emergent angle.

Optionally, the control electrode includes a common electrode and a plurality of pixel electrodes, at least one of the common electrode or the plurality of pixel electrodes is at the side of the light guide plate facing towards the first substrate, and the plurality of pixel electrodes are stripe electrodes.

Optionally, each grating of the plurality of gratings includes at least two grating components, and orthographic projections of the at least two grating components onto the first substrate partially overlap with or completely coincide with orthographic projections of the plurality of pixel electrodes onto the first substrate.

Optionally, each grating of the plurality of gratings is a vertical grating or an inclined grating.

Optionally, the plurality of pixel electrodes is in the liquid crystal layer or the plurality of pixel electrodes is further configured to function as the at least two grating components.

Optionally, a reflective index of the light guide plate is smaller than a reflective index of the plurality of gratings.

Optionally, the display device includes a plurality of pixel regions, each pixel region of the plurality of pixel regions includes at least one pixel. At least one of a grating period, a grating height or a duty cycle of gratings corresponding to pixels in different ones of the plurality pixel regions are different so that lights emergent from the different gratings of the plurality of gratings converge to a same area.

Optionally, an emergent angle of incident light after being diffracted by each grating of the plurality of gratings is calculated using a following formula: $\sin \gamma - \sin \gamma' = m \lambda/P$ ($m=0, \pm 1, \pm 2, \ldots$); where m is a diffracted wave order of the grating, P is a grating period of the grating, $\lambda$ is a wavelength of the incident light of the grating, $\gamma$ is an incident angle of the incident light of the grating, and $\gamma'$ is an emergent angle of the incident light after being diffracted by the grating.

Optionally, the first substrate is at a light emergent side of the display device, and the display device further includes a second substrate at a side of the light guide plate away from the first substrate.

Optionally, the optical component includes a reflective cover having a partial paraboloid and a gathering cover extending from the reflective cover, a second end portion of the gathering cover is at a vertex of the partial paraboloid of the reflective cover, and a first end portion of the gathering cover away from the reflective cover abuts against the lateral surface of the light guide plate.

Optionally, the plurality of monochromatic light emitting components is self-illumination components and the plurality of monochromatic light emitting components are arranged, along a direction parallel to the first substrate, at different positions outside a surface of the optical component opposite to the reflective cover and the gathering cover.

Optionally, the plurality of monochromatic light emitting components includes a red light emitting component, a green light emitting component and a blue light emitting component. The green light emitting component is at a focal position of the reflective cover, and an incident angle of light emitted by the green light emitting component and incident into the light guide plate is larger than an incident angle of light emitted by the blue light emitting component and incident into the light guide plate and smaller than an incident angle of light emitted by the red light emitting component and incident into the light guide plate.

Optionally, the reflective cover includes a reflective cover body and a reflective layer coated on the reflective cover body, the reflective layer is at a side of the reflective cover body away from the plurality of monochromatic light emitting components, and difference between a refractive index of the reflective cover body and a refractive index of the light guide plate is smaller than a selected threshold.

Optionally, the display device further includes a first alignment layer at a side of the light guide plate facing towards the liquid crystal layer; and a second alignment layer at a side of the first substrate facing towards the liquid crystal layer; wherein the plurality of gratings is at a side of the first alignment layer facing towards the liquid crystal layer or at a side of the first alignment layer away from the liquid crystal layer.

Optionally, the plurality of monochromatic light emitting components includes a red light emitting component, a green light emitting component and a blue light emitting component, a size of each monochromatic light emitting component of the plurality of monochromatic light emitting components is smaller than 200 µm, the green light emitting component is at a focal position of the reflective cover, the red light emitting component is at a position shifted 200 µm from the focal position of the reflective cover in a direction approaching the light guide plate, and the blue light emitting component is at a position shifted 200 µm from the focal position of the reflective cover in a direction departing from the light guide plate.

In a second aspect, a display method applied to the display device according to the first aspect is provided in the present disclosure, and includes: controlling the plurality of monochromatic light emitting components to be lit up at different time stages in a display of one image frame.

Optionally, the controlling the plurality of monochromatic light emitting components to be lit up at different time stages in the display duration of one image frame includes: controlling the plurality of monochromatic light emitting components to be lit up for a same time duration.

Optionally, the controlling the plurality of monochromatic light emitting components to be lit up at different time stages in the display duration of one image frame, includes: controlling the plurality of monochromatic light emitting components to be lit up with a same brightness.

BRIEF DESCRIPTION OF THE DRAWINGS

In order to describe technical solutions of some embodiments of the present disclosure more clearly, drawings used in description of some embodiments of the present disclosure will be briefly introduced hereinafter. Apparently, the drawings described below are merely some embodiments of the present disclosure. One of ordinary skills in the art may obtain other drawings based on the drawings without paying creative efforts.

DETAILED DESCRIPTION

For purpose of making objectives, technical solutions, and advantages of some embodiments of the present disclosure clearer, the technical solutions of some embodiments of the present disclosure will be described clearly and completely hereinafter in combination with drawings of some embodiments of the present disclosure. Obviously the described embodiments are a part, rather than all, of the embodiments of the present application. All other embodiments obtained by one skilled in the art based on the embodiments described herein fall within the protection scope of the present disclosure.

A display device and a display method provided in the present disclosure may at least achieve a high resolution (PPI, Pixel Per Inch) of the display device.

Figure 1:
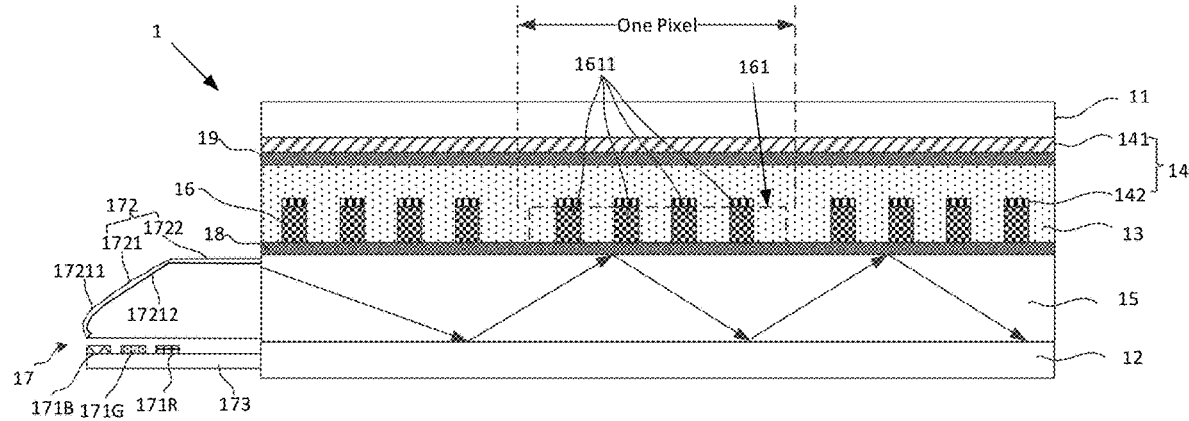
FIG. 1 is a structural schematic diagram of a display device according to some embodiments of the present disclosure.

As shown in FIG. 1, a display device 1 is provided in some embodiments of the present disclosure. The display device 1 includes: a first substrate 11, a light guide plate 15 opposite to the first substrate 11, and, a liquid crystal layer 13 and a control electrode 14 between the first substrate 11 and the light guide plate 15. An effective refractive index of the liquid crystal layer 13 to an incident light may be controlled to change between 'ne' and 'no' by applying a driving voltage to the control electrode 14, wherein the 'ne' is a refractive index of the liquid crystal layer 13 to an extraordinary light (e light) and the 'no' is a refractive index of the liquid crystal layer 13 to an ordinary light (o light).

Optionally, the display device 1 further includes a grating layer 16. The grating layer 16 is at a side of the light guide plate 15 facing towards the liquid crystal layer 13. The grating layer 16 includes a plurality of gratings 161. Each of the plurality of gratings 161 corresponds to one pixel of the display device and includes at least two grating components 1611. Each of the plurality of gratings 161 includes four grating components 1611, as shown in FIG. 1 to FIG. 4. It may be understood that each of the plurality of gratings 161 may optionally include more than four grating components 1611. An refractive index of each of the plurality of gratings 161 is n, where no≤n≤ne.

Optionally, the display device 1 further includes a light source 17 at a lateral surface of the light guide plate 15, wherein the lateral surface is parallel to a light emergent direction of the display device 1. The light source 17 includes a plurality of monochromatic light emitting components 171 and an optical component 172. The plurality of monochromatic light emitting components 171 emits lights of different colors, such red light, green light or blue light. The lights of different colors emitted by the plurality of monochromatic light emitting components 171 are incident, via the optical component 172, into the light guide plate 15 at different incident angles and are emergent out of the plurality of gratings 161. The incident angles of the lights of different colors emitted by the plurality of monochromatic light emitting components are greater than a total reflection angle of the light guide plate 15.

Optionally, the display device 1 may further include a second substrate 12 at a side of the light guide plate 15 away from the first substrate 11. In some embodiments of the present disclosure, the first substrate 11 and the second substrate 12 may be made of a material such as optical glass or resin. However, the material of the substrates is not limited thereto in the present disclosure.

In some embodiments of the present disclosure, the liquid crystal layer 13 may adopt nematic liquid crystals, blue phase liquid crystals or the like. Types of liquid crystals are not limited thereto in the present disclosure, as long as the effective refractive index of the liquid crystal layer 13 to the incident light may be adjusted by adjusting the driving voltage applied to the liquid crystal layer 13. The refractive index of the liquid crystal layer 13 to the extraordinary light is 'ne' and the refractive index of the liquid crystal layer 13 to the ordinary light is 'no'.

Optionally, difference Δn between the 'ne' and the 'no' may be large. In some embodiments of the present disclosure, the difference Δn between the 'ne' and the 'no' may be, for example, greater than or equal to 0.2.

Figure 2:
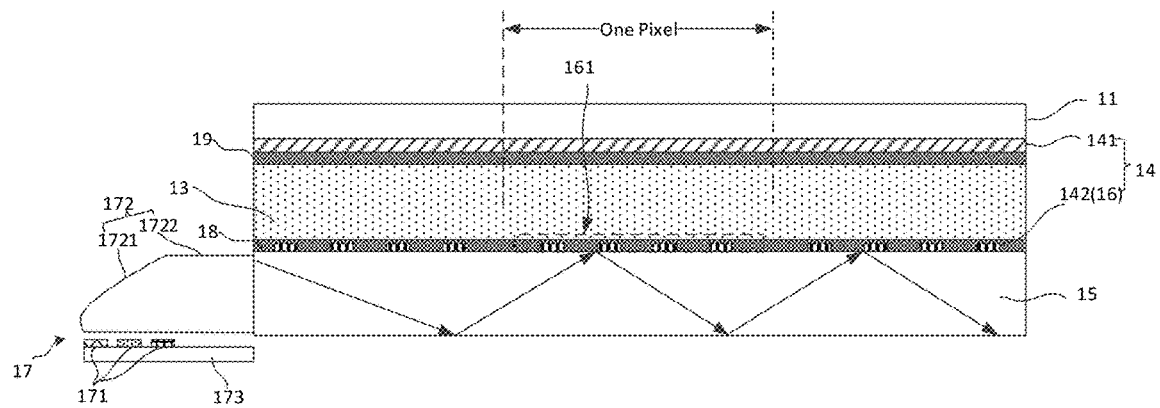
FIG. 2 is a structural schematic diagram of a display device according to some embodiments of the present disclosure.
Figure 4:
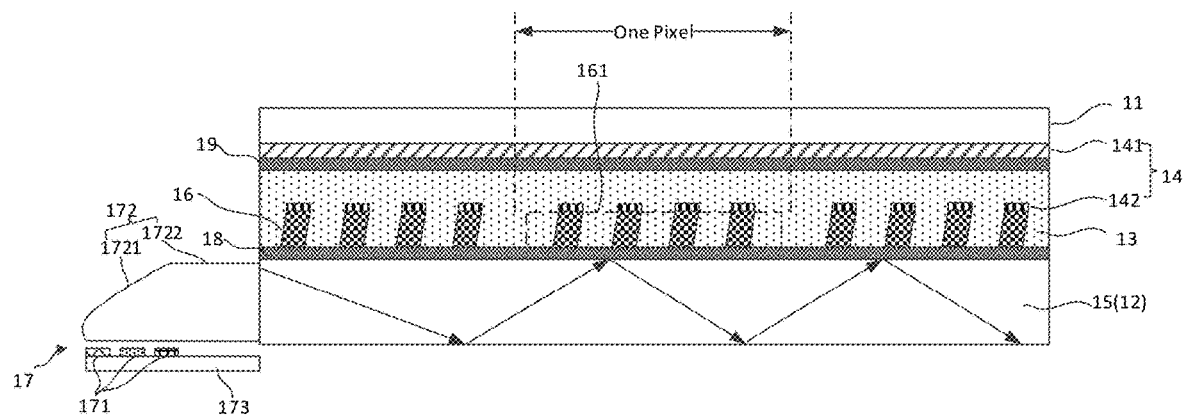
FIG. 4 is a structural schematic diagram of a display device according to some embodiments of the present disclosure.

In some embodiments of the present disclosure, the control electrode 14 may include a common electrode 141 and a plurality of pixel electrodes 142. As shown in FIG. 1, FIG. 2 and FIG. 4, the common electrode 141 is on the first substrate 11 and the plurality of pixel electrodes 142 is arranged on the light guide plate 15. Optionally, positions of the common electrode 141 and the plurality of pixel electrodes 142 may be interchanged, i.e., the common electrode may be on the light guide plate 15 and the plurality of pixel electrodes 141 may be on the first substrate 11.

Figure 3:
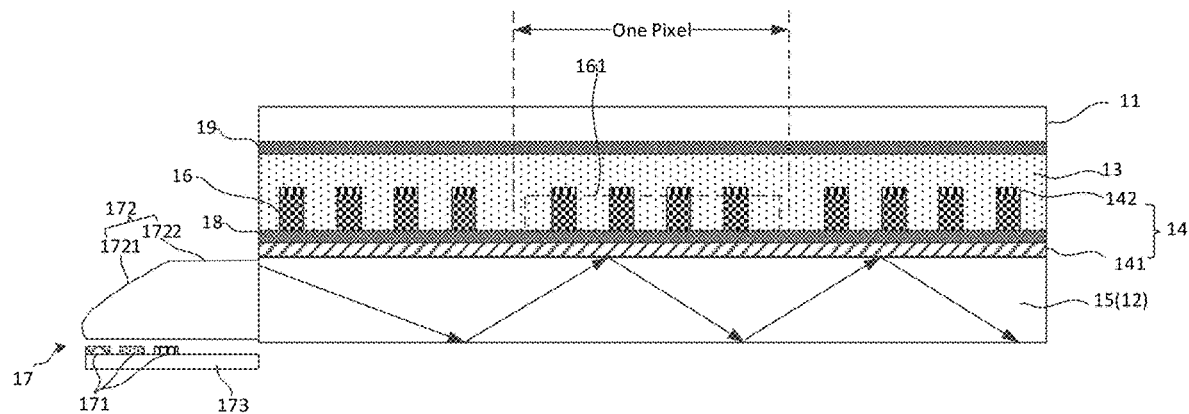
FIG. 3 is a structural schematic diagram of a display device according to some embodiments of the present disclosure.

In the display device shown in FIG. 1, FIG. 3 and FIG. 4, each of the plurality of pixel electrodes 142 is on one of the grating components 1611 corresponding to the pixel electrode in the plurality of gratings 161 and is in the liquid crystal layer 13.

Optionally, as shown in FIG. 2, the common electrode 141 is at a side of the first substrate 11 facing towards the liquid crystal layer 13, and each of the plurality of pixel electrodes 142 is on the light guide plate 15 and is outside the liquid crystal layer 13.

Optionally, as shown in FIG. 3, both the common electrode 141 and the plurality of pixel electrodes 142 may be on the light guide plate 15. Specifically, the common electrode 141 is at a side of the light guide plate 15 facing towards the liquid crystal layer 13, and each of the plurality of pixel electrodes 142 is on one of the grating components 1611 corresponding to the pixel electrode and is in the liquid crystal layer 13.

In the embodiments shown in FIGS. 1-4, the common electrode 141 in each pixel unit is a planar electrode and each pixel electrode 142 is a stripe electrode. Optionally, the common electrode 141 may be a stripe electrode and the pixel electrodes 142 may be planar electrodes, or both the common electrode 141 and the pixel electrodes 142 may be stripe electrodes.

In some embodiments of the present disclosure, the light guide plate 15 may be made of transparent material such as resin (e.g., PMMA) or optical glass. A refractive index of the light guide plate 15 is smaller than that of the gratings 161. As shown in FIG. 1, the light guide plate 15 is on the second substrate 12, and the light guide plate 15 and the second substrate are arranged independently. Since a material of the light guide plate 15 is identical to that of the second substrate 12, the light guide plate 15 may optionally serve as the second substrate 12, that is, the light guide plate 15 may be the second substrate 12, thereby reducing a thickness of the display device, as shown in FIG. 2, FIG. 3 and FIG. 4. In some embodiments of the present disclosure, optionally, a thickness of the light guide plate 15 is larger than or equal to 0.5 mm in order to provide a better light propagation path.

In some embodiments of the present disclosure, optionally as shown in FIG. 1 and FIG. 3, orthographic projections of the grating components 1611 onto the first substrate 11 completely coincide with orthographic projections of the pixel electrodes 142 onto the first substrate 11, thereby not adversely affecting outputting the lights. As shown in FIG. 1 and FIG. 3, the grating components 1611 and the pixel electrodes 142 may be formed through one patterning process, thereby reducing a quantity of masks used in manufacturing the display device. Optionally, as shown in FIG. 4, the pixel electrodes 142 may be stacked on the grating components 1611, and the orthographic projections of the grating components 1611 onto the first substrate 11 overlap with the orthographic projections of the pixel electrodes 142 onto the first substrate 11.

In some embodiments of the present disclosure, as shown in FIG. 2, the pixel electrodes 142 may optionally serve as the grating components 1611, in order to reduce the quantity of the masks and the thickness of the display device.

In the embodiments shown in FIG. 1 to FIG. 3, all of the gratings 161 are vertical gratings. In some other embodiments of the present disclosure, the gratings 161 may be inclined gratings, as shown in FIG. 4.

In some embodiments of the present disclosure, the light source 17 may be a collimated light source and include the plurality of monochromatic light emitting components 171. Different ones of the plurality of monochromatic light emitting components 171 emit monochromatic lights of different colors and the monochromatic lights emitted by the plurality of monochromatic light emitting components 171 may be mixed to generate white light. In the embodiments shown in FIG. 1 to FIG. 4, the light source 17 includes three monochromatic light emitting components. The three monochromatic light emitting components may be, for example, a red light emitting component 171R, a green light emitting component 171G, and a blue light emitting component 171B. Optionally, in some embodiments of the present disclosure, a quantity of the monochromatic light emitting components 171 included in the light source 17 is not limited to three, and the light source 17 is not limited to include the red light emitting component, the green light emitting component, or the blue light emitting component. Lights emitted by the monochromatic light emitting components 171 may be incident into the light guide plate 15 after being processed by the optical component 172. Since the incident angle is larger than the total reflection angle of the light guide plate 15, the lights may propagate in the light guide plate 15 due to total reflection and may be outputted through optical coupling of the grating layer 16.

In some embodiments of the present disclosure, since the light source 17 includes the plurality of monochromatic light emitting components, the plurality of monochromatic light emitting components 171 may be controlled to be lit up at different time stages in a display period of one image frame, i.e., the lights emitted by the plurality of monochromatic light emitting modules 171 enter the light guide plate 15 at different time stages and then are coupled and outputted through the gratings 161. In addition, since each of the plurality of gratings 161 corresponds to one pixel of the display device, the monochromatic lights emitted by the plurality of monochromatic light emitting components 171 may be incident into one pixel at different time stages and accordingly multiple pixels for outputting monochromatic lights of different colors respectively are not needed. A resolution (PPI) of the display device provided in the present disclosure may be effectively enhanced without changing difficulty of a current manufacturing process. Thus, the display device in the present disclosure may be applied to scenarios in which a high PPI is required, such as in a near-to-eye directional display. For example, in comparison with a PPI of a display device adopting a technique of mixing red, green, and blue lights, the PPI of the display device in the present disclosure may be increased by three times.

In some embodiments of the present disclosure, the lights emitted by the light source 17 and incident to the gratings 161 are monochromatic lights. As compared with white light provided by a backlight source in the related art, the lights provided by the light source 17 in the present disclosure do not include interference lights of other colors, thereby improving light efficiency. In addition, the gratings 161 are very sensitive to a wavelength of incident light. If the incident light is the white light, a chromatic dispersion phenomenon may probably appear. The chromatic dispersion phenomenon may be solved if the incident light is the monochromatic light.

Figure 9:
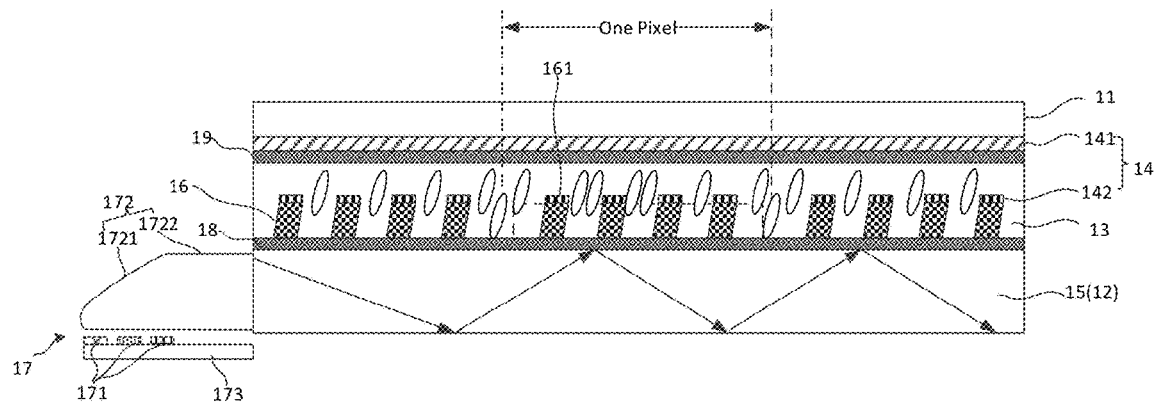
FIG. 9 and FIG. 10 are schematic diagrams of displaying gray scales by a display device according to some embodiments of the present disclosure.
Figure 10:
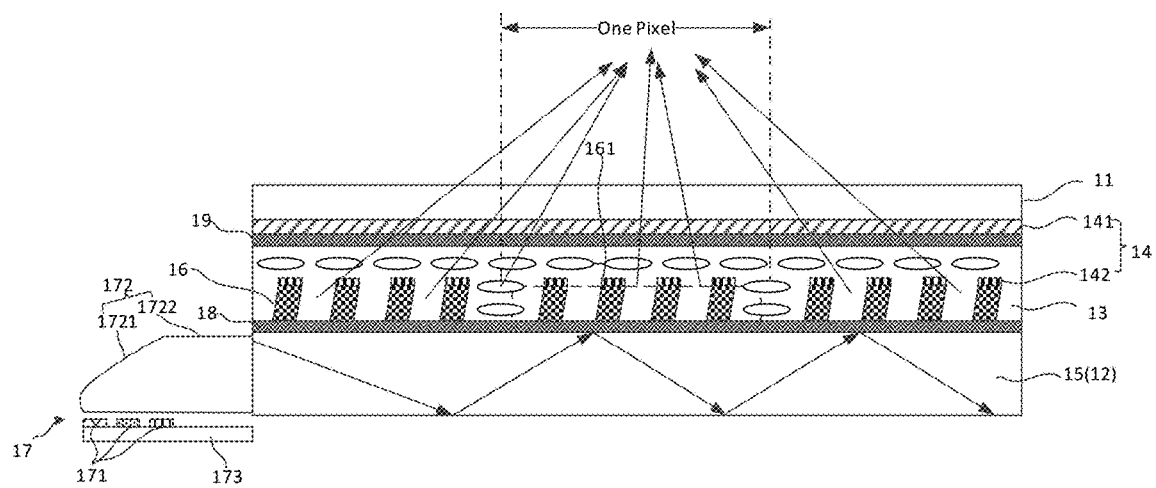

In some embodiments of the present disclosure, the refractive index 'n' of the grating 161 is larger than or equal to the refractive index 'no' of the liquid crystal layer 13 to the ordinary light and is smaller than or equal to the refractive index 'ne' of the liquid crystal layer 13 to the extraordinary light. Optionally, the refractive index of the grating 161 is selected to be the 'no' or the 'ne'. In this way, the driving voltage may be applied to the control electrode 14 to cause liquid crystal molecules in the liquid crystal layer 13 to rotate, thereby adjusting the effective refractive index of the liquid crystal layer 13 to the incident light. In case that the effective refractive index of the liquid crystal layer 13 to the incident light is adjusted to be equal to the refractive index of the gratings 161, the gratings 161 do not function and no light is emitted out of the gratings 161 and the display device is in a dark state (normally black mode), i.e., a L0 state as shown in FIG. 9. In a case that difference between the effective refractive index of the liquid crystal layer 13 to the incident light and the refractive index of the gratings 161 is adjusted to be a maximum value, a function of the gratings 161 is most significant, and a light efficiency of light emitted from the gratings 161 is maximum. In such a case, the display device is in a bright state (normally white mode), i.e., a L255 state as shown in FIG. 10. In a case that the effective refractive index of the liquid crystal layer 13 to the incident light is a value other than those in the above two cases, the display device in other gray scale states. Since a polarized light ('e' light) is sensitive to a change of the refractive index, but another polarized light ('o' light) is not sensitive to the change of the refractive index, the light coupled by and outputted from the gratings 161 is the 'e' light. That is, in some embodiments of the present disclosure, by controlling the change of the effective refractive index of the liquid crystal layer 13 to the incident light, the difference between the effective refractive index of the liquid crystal layer 13 to the incident light and the refractive index of the gratings 161 may be adjusted, thereby controlling a light emitting amount of the gratings 161 and achieving different gray scale displays.

In some embodiments of the present disclosure, as shown in FIG. 1 to FIG. 4, the display device 1 may further include a first alignment layer 18 and a second alignment layer 19. The first alignment layer 18 is at a side of the light guide plate 15 facing towards the liquid crystal layer. The second alignment layer 19 is at a side of the first substrate 11 facing towards the liquid crystal layer 13. The first alignment layer 18 and the second alignment layer 19 are configured to control an initial arrangement state of the liquid crystal molecules, such that the liquid crystal molecules may rotate in an expected manner according to the applied driving voltage, and thereby whether the display device is in the normally black mode or in the normally white mode may be determined. Optionally, in the case that the display device 1 includes the first alignment layer 18 and the second alignment layer 19 and the pixel electrodes 142 are used as the grating components, the pixel electrodes 142 may be covered by the first alignment layer 18.

In some embodiments of the present disclosure, each of the gratings 161 causes the monochromatic lights of different colors incident into the light guide plate 15 to emerge out at an identical angle, thereby improving a display effect of the display device.

In some embodiments of the present disclosure, the display device may include a plurality of pixel regions. Each of the plurality of pixel regions includes at least one pixel. The gratings 161 corresponding to the pixels in different pixel regions have different grating parameters, so that lights emergent from different ones of the gratings 161 converge to a same area, thereby realizing the near-to-eye directional display. Optionally, the gratings 161 corresponding to the pixels at different positions have different structures, thereby improving the display effect. To reduce the difficulty of the manufacturing process, optionally, each of the pixel regions includes a plurality of pixels, and grating parameters of gratings 161 corresponding to the plurality of pixels are the same.

Figure 5:
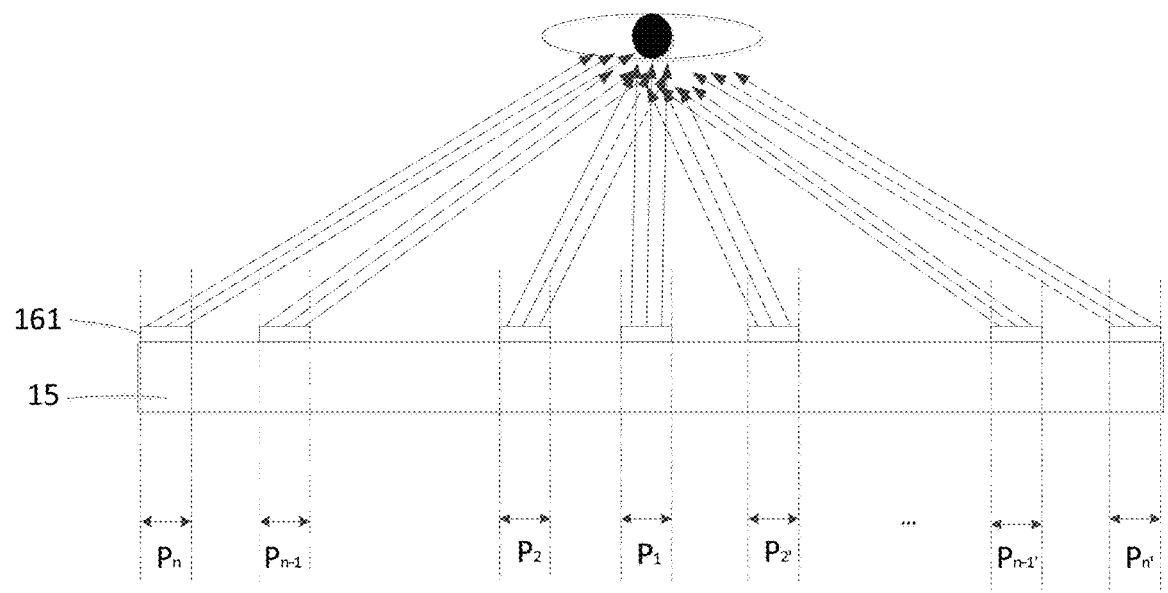
FIG. 5 is a schematic diagram of a near-to-eye direction scene to which a display device of some embodiments of the present disclosure is applied.

In some embodiments of the present disclosure, each of the grating parameters may include a grating period, a grating height, a duty ratio or the like. Optionally, at least one of the grating period, the grating height, or the duty ratio of gratings in different pixel regions is different. For example, as shown in FIG. 5, the gratings 161 corresponding to the pixels in different pixel regions have different grating periods P (i.e., $P_1, P_2, \ldots, P_{n-1}, P_n, P_{2'}, P_{n-1'}, P_{n'}$ as shown in FIG. 5) such that lights emergent from the gratings 161 in different pixel regions converge to a position of a human eye, thereby achieving the near-to-eye directional display. Optionally, in some embodiments of the present disclosure, the gratings in different pixel regions have different periods, and grating parameters other than the period may be configured according to needs and may be the same or different.

As shown in FIG. 5, emergent angles of light from the gratings 161 corresponding to the pixels in different pixel regions are different. The emergent angle of the light from the grating 161 may be calculated based on a relative position between the grating 161 and the human eye.

In some embodiments of the present disclosure, an emergent angle of incident light after being diffracted by the grating 161 may be calculated using a formula as follow: $\sin\gamma - \sin\gamma' = m\lambda/P$ ($m=0, \pm 1, \pm 2, \ldots$); where m is a diffracted wave order of the grating, P is the grating period of the grating, $\lambda$ is a wavelength of the incident light of the grating, $\gamma$ is an incident angle of the incident light of the grating, and $\gamma'$ is the emergent angle of the incident light after being diffracted by the grating.

If the emergent light from the display device is collimated light, then $$\gamma'=0, \text{ i.e., } \sin\gamma = m\lambda/P(m=0,\pm 1,\pm 2,\ldots).$$

It may be seen from the above formula that, if a grating 161 at a fixed pixel position has a fixed period, and monochromatic lights of different colors may emerge at the same angle by configuring different incident angles for different monochromatic light emitting components 171. The different incident angles of the monochromatic lights emitted by different monochromatic light emitting components 171 are determined by different positions of the different monochromatic light emitting components relative to the optical component 172. By adjusting the positions of the different monochromatic light emitting components relative to the optical component 172, the incident angles of different monochromatic lights may be adjusted.

In some embodiments of the present disclosure, the plurality of monochromatic light emitting components 171 is at different positions relative to the optical component 172, respectively, so that the monochromatic lights emitted by the different monochromatic light emitting components 171 have different incident angles at the lateral surface of the light guide plate and further the monochromatic lights of different colors may be emergent at the same angle.

An example of a structure of the light source 17 provided in some embodiments of the present disclosure will be described hereinafter, to further explain how the positions of the monochromatic light emitting components 171 relative to the optical component 172 is configured in the light source 17.

Referring to FIG. 1 to FIG. 4, in some embodiments of the present disclosure, the optical component 172 includes a reflective cover 1721 having a partial paraboloid and a gathering cover 1722 extending from the reflective cover 1721. A first end portion of the gathering cover 1722 away from the reflective cover 1721 abuts against the lateral surface of the light guide plate 15. The gathering cover 1722 may gather light reflected by the reflective cover 1721 into the light guide plate 15, so as to improve a light efficiency of the light guide plate. Optionally, a second end portion of the gathering cover 1722 is at a vertex of the partial paraboloid of the reflective cover 1721.

Optionally, the plurality of monochromatic light emitting components are arranged, along a direction parallel to the first substrate, at different positions outside a surface of the optical component opposite to the reflective cover 1721 and the gathering cover 1722.

In some embodiments of the present disclosure, the reflective cover 1721 and the gathering cover 1722 may be made of metallic materials such as Al, Ag or the like.

In some embodiments of the present disclosure, the reflective cover 1721 may include a reflective cover body 17211 and a reflective layer 17212 coated on the reflective cover body 17211. The reflective layer may be coated on an external surface (a surface away from the monochromatic light emitting components 171) of the reflective cover body, or on an internal surface (a surface facing towards the monochromatic light emitting components 171 as shown in FIG. 1) of the reflective cover body. In a case that the reflective layer is on the external surface of the reflective cover body, optionally, difference between a refractive index of the reflective cover body and a refractive index of the light guide plate 15 is smaller than a selected threshold, and the threshold may be any small value. That is to say, the refractive index of the reflective cover body is similar to or the same as the refractive index of the light guide plate 15, thereby improving the light efficiency.

In some other embodiments of the present disclosure, the optical component may have other structures as long as the optical component may enable the lights emitted by the different monochromatic light emitting components 171 to enter the light guide plate 15 at different incident angles.

In FIG. 1 to FIG. 4, the light source 17 includes a red light emitting component, a green light emitting component and a blue light emitting component. Red light has a largest wavelength, blue light has a smallest wavelength and green light has a wavelength between those of the red light and the blue light. To realize that the lights having different wavelengths emergent from a same pixel emerge at a same angle, an incident angle of the green light emitted by the green light emitting component and incident into the light guide plate is larger than that of the blue light emitted by the blue light emitting component and incident into the light guide plate, and is smaller than that of the red light emitted by the red light emitting component and incident into the light guide plate.

Figure 6:
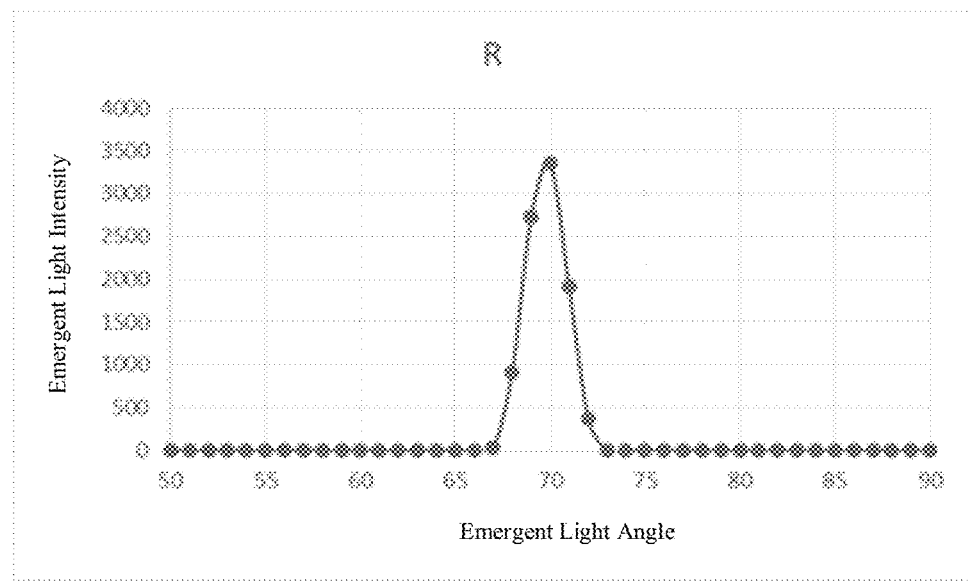
FIGS. 6-8 are schematic diagrams of simulation results of a relation between an emergent light intensity and an emergent light angle of a reflective cover corresponding to monochromatic light emitting components at fixed positions according to some embodiments of the present disclosure.
Figure 7:
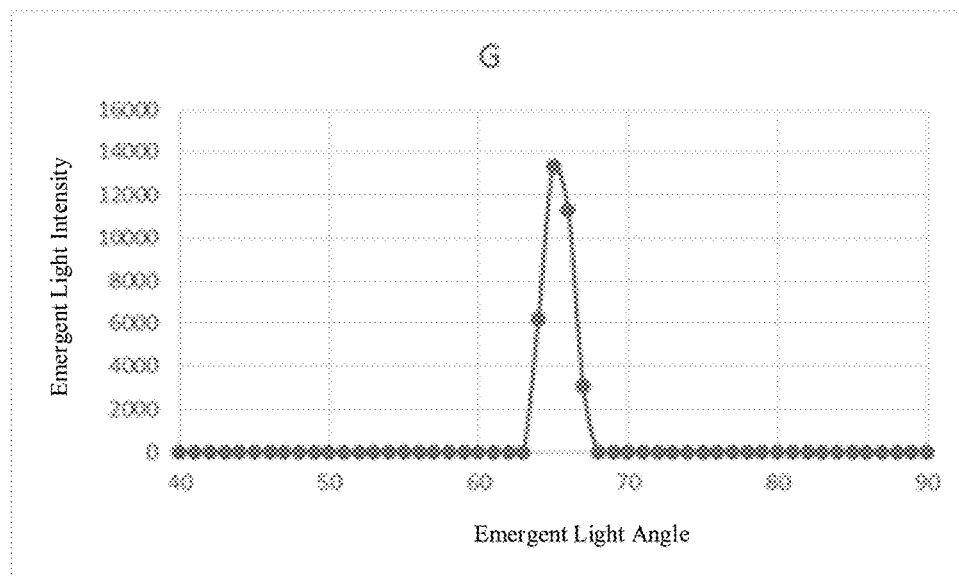
Figure 8:
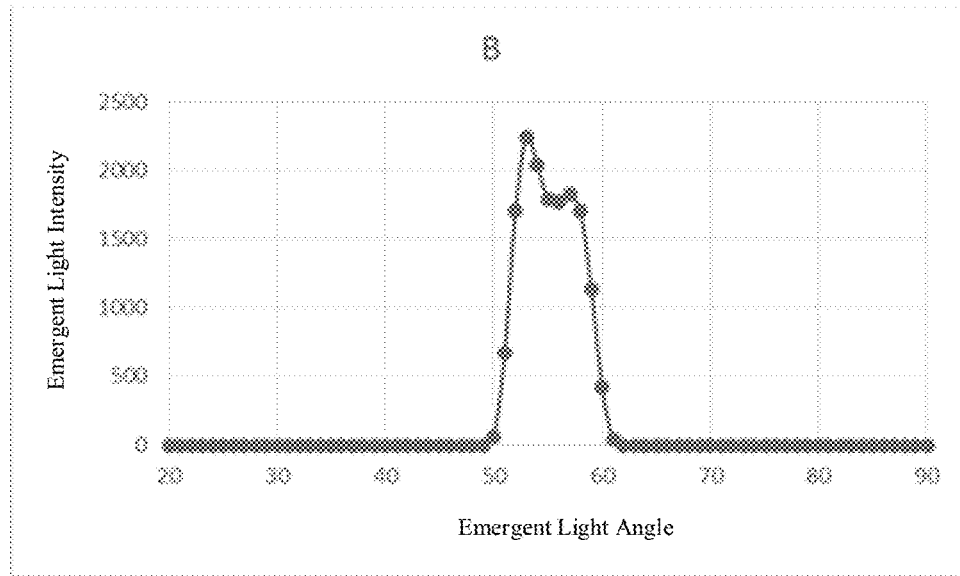

It may be seen, through simulation experiments on an emergent light intensity and an emergent light angle of the reflective cover shown in FIG. 6 to FIG. 8, that the emergent light angle of the reflective cover may be adjusted by adjusting positions of the monochromatic light emitting components. When the green light emitting component is at a focal position of the reflective cover, the emergent light angle of the reflective cover is approximately in a range of 62 degrees to 66 degrees and the emergent light intensity is best. When the red light emitting component is at a position shifted 200 μm rightwards from the focal position, the emergent light angle of the reflective cover is approximately in a range of 67 degrees to 73 degrees and the emergent light intensity is best. When the blue light emitting component is at a position shifted 200 μm leftwards from the focal position, the emergent light angle of the reflective cover is approximately in a ranges of 50 degrees to 61 degrees and the emergent light intensity is best.

In some embodiments of the present disclosure, as shown in FIG. 1 to FIG. 4, the light source 17 optionally further include a reflective sheet 173 at a side of the monochromatic light emitting components 171 opposite to the light emergent side and configured to improve the light efficiency.

In some embodiments of the present disclosure, the light source 17 is a self-illumination component such as a micro LED light source, an OLED (Organic Light Emitting Diode) light source or a mini LED. In a case that the light source 17 in some embodiments of the present disclosure is the micro LED light source, since the micro LED light source has a relatively narrow wavelength half-peak width which may reach 15 nm, the chromatic dispersion phenomenon may be effectively alleviated and a viewing angle of the display device may be increased. The micro LED light source may be formed through a Transfer-Printing process or a Micro-Transfer-Printing process. Optionally, the light source 17 in some embodiments of the present disclosure has a width smaller than 200 μm, thereby decreasing a volume of the light source and realizing a light and thin display device.

A display method is further provided in some embodiments of the present disclosure. The display method is applied to the above display device. The display method includes: controlling a plurality of monochromatic light emitting components to be lit up at different time stages in a display period of one image frame.

In some embodiments of the present disclosure, optionally, the controlling the plurality of monochromatic light emitting components to be lit up at different time stages may include: controlling the plurality of monochromatic light emitting components to be lit up for a same time duration, so as to improve the display effect.

In some embodiments of the present disclosure, optionally, the controlling the plurality of monochromatic light emitting components to be lit up at different time stages may include: controlling the plurality of monochromatic light emitting components to be lit up with a same brightness, to improve the display effect.

Figure 11:
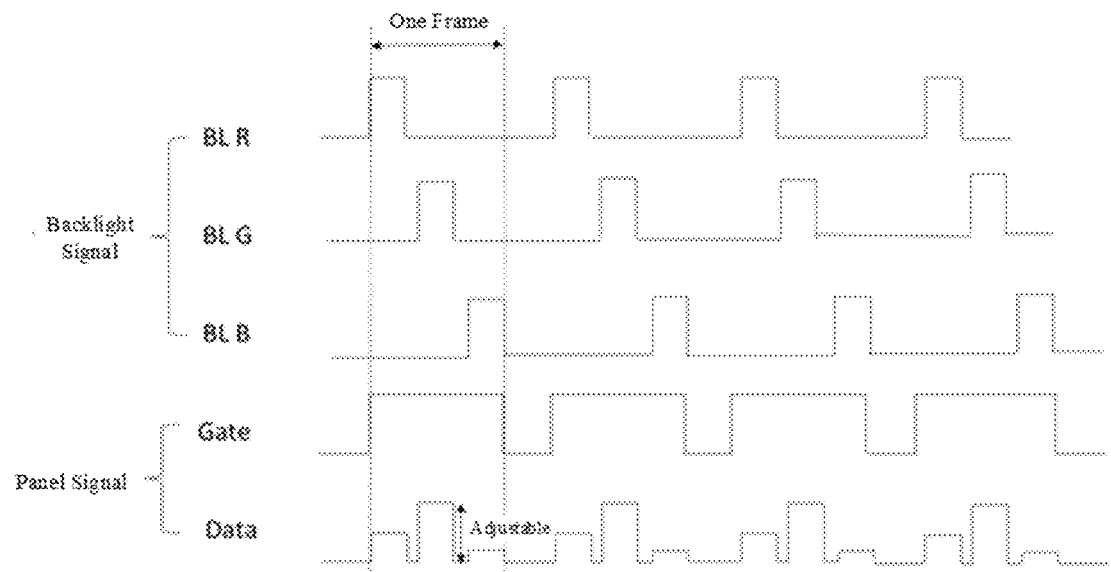
FIG. 11 is a timing diagram of a control signal of a light source according to some embodiments of the present disclosure.

Specifically, referring to FIG. 11, in a display period of one image frame, backlight signals control displayed color information. The backlight signals may include a control signal for controlling the red light emitting component (BLR), a control signal for controlling the green light emitting component (BLG), and a control signal for controlling a blue light emitting component (BLB). As shown in FIG. 11, the duration for which each of the red light emitting component, the green light emitting component and the blue light emitting component is lit up accounts for ⅓ of the display period of one image frame, and the brightness of the red light emitting component, the brightness of the green light emitting component and the brightness of the blue light emitting component are the same. In the display period of one image frame, a panel signal of a display panel controls a displayed gray scale and includes a gate signal Gate and a data signal Data. As shown in FIG. 11, when the display device displays a white image, a proportion among a signal intensity for controlling emission of the red light, a signal intensity for controlling emission of the green light and a signal intensity for controlling emission of the blue light in the data signal is 3:6:1. In some embodiments of the present disclosure, a structure formed of components other than the light source in the display device is referred as a display panel.

Figure 12:
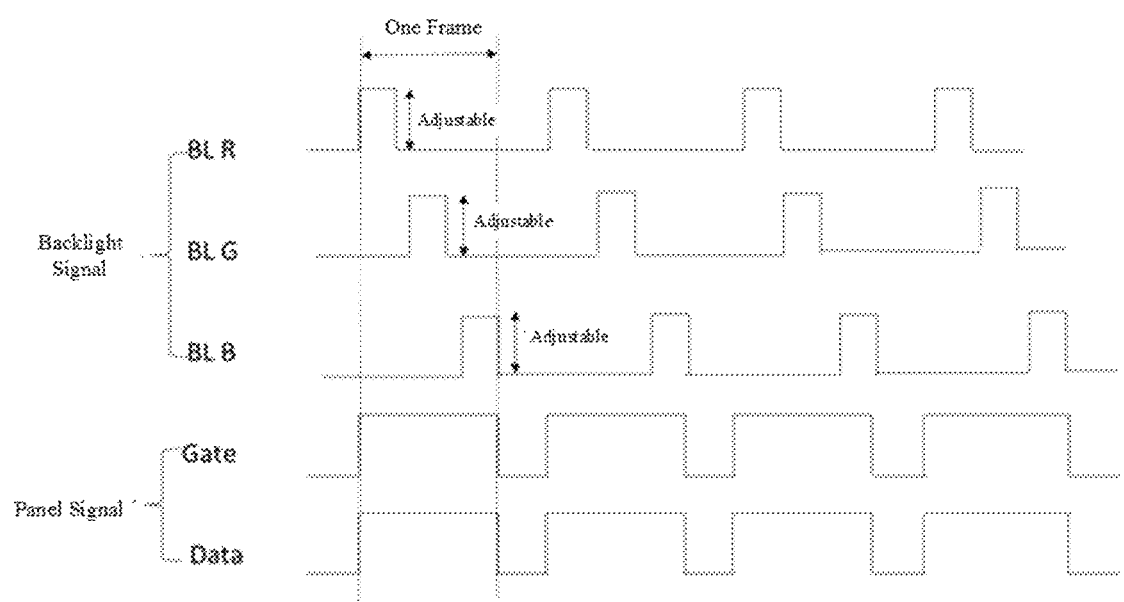
FIG. 12 is another timing diagram of a control signal of a light source according to some embodiments of the present disclosure.

Optionally, referring to FIG. 12, in the display period of one image frame, the backlight signals control provisions of color information and control the displayed gray scale. The backlight signals may include the control signal for the red light emitting component (BLR), the control signal for the green light emitting component (BLG) and the control signal for the blue light emitting component (BLB). As shown in FIG. 12, a duration for which each of the red light emitting component, the green light emitting component and the blue light emitting component is lit up accounts for ⅓ of the display period of the image frame, respectively, and the brightness of the red light emitting component, the brightness of the green light emitting component and the brightness of the blue light emitting component are the same. In the display period of one image frame, the panel signal of the display panel only has a switching function, and both the gate signal Gate and the data signal Data are turned on in the display period of the one image frame.

Thus, the display device and the display method in the present disclosure may effectively increase the resolution (PPI) of the display device without changing the difficulty of the manufacturing process, and are applied to the scenarios in which a high PPI is required, such as in the near-to-eye directional display.

Unless otherwise defined, technical terms or scientific terms used in the present disclosure shall have common meanings understood by one of ordinary skills in the art. Terms such as "first" and "second" in the present disclosure do not indicate any order, quantity, or importance, but are used to distinguish different components. Terms such as "coupled" or "connected" are not used to limit physical or mechanical connections, but may be electrical connections, whether indirect connections or direct connections. Terms such as "above", "below", "left" or "right" are to describe relative position relationships. If an absolute position of a described object changes, relative positions with respect to the described object change correspondingly.

Optional embodiments are described hereinabove. It should be noted that various improvements and embellishments may be made by those ordinary skilled in the art without departing from the principle of the present disclosure, and those improvements and embellishments also fall within the protection scope of the present disclosure.

What is claimed is:

1. A display device, comprising:
   a first substrate;
   a light guide plate opposite to the first substrate;
   a grating layer on the light guide plate, wherein the grating layer is at a side of the light guide plate facing towards the first substrate, the grating layer comprises a plurality of gratings, and each grating of the plurality of gratings corresponds to one pixel of the display device; and
   a light source at a lateral surface of the light guide plate, the lateral surface being parallel to a light emergent direction of the display device, wherein the light source comprises a plurality of monochromatic light emitting components and an optical component, lights of different colors emitted by the plurality of monochromatic light emitting components are incident into, via the optical component, the light guide plate at different incident angles and are emergent from the plurality of gratings, and the different incident angles are greater than a total reflection angle of the light guide plate, each grating of the plurality of gratings makes the lights of different colors incident into the light guide plate to be emergent out at a same emergent angle.

2. The display device according to claim 1, further comprising:
   a liquid crystal layer and a control electrode between the first substrate and the light guide plate,
   wherein the liquid crystal layer is configured to change, in response to a driving voltage applied to the control electrode, an effective refractive index n of the liquid crystal layer to the lights emergent from the plurality of gratings between ne to no, ne is a refractive index of the liquid crystal layer to an extraordinary light, no is a refractive index of the liquid crystal layer to an ordinary light, where no≤n≤ne.

3. The display device according to claim 2, wherein the control electrode comprises a common electrode and a plurality of pixel electrodes, at least one of the common electrode or the plurality of pixel electrodes is at the side of the light guide plate facing towards the first substrate, and the plurality of pixel electrodes are stripe electrodes.

4. The display device according to claim 3, wherein each grating of the plurality of gratings comprises at least two grating components, and orthographic projections of the at least two grating components onto the first substrate partially overlap with or completely coincide with orthographic projections of the plurality of pixel electrodes onto the first substrate.

5. The display device according to claim 4, wherein each grating of the plurality of gratings is a vertical grating or an inclined grating.

6. The display device according to claim 3, wherein the plurality of pixel electrodes is in the liquid crystal layer or the plurality of pixel electrodes is further configured to function as the at least two grating components.

7. The display device according to claim 3, wherein each of the plurality of pixel electrodes directly contacts with the grating layer and is closer to the first substrate than the grating layer.

8. The display device according to claim 1, wherein a reflective index of the light guide plate is smaller than a reflective index of the plurality of gratings.

9. The display device according to claim 1, wherein the display device comprises a plurality of pixel regions, each pixel region of the plurality of pixel regions comprises at least one pixel;

at least one of a grating period, a grating height or a duty cycle of gratings corresponding to pixels in different ones of the plurality pixel regions are different so that lights emergent from the different gratings of the plurality of gratings converge to a same area.

10. The display device according to claim 1, wherein an emergent angle of incident light after being diffracted by each grating of the plurality of gratings is calculated using a following formula: sin γ−sin γ'=m λ/P (m=0, ±1, ±2, . . . );

where m is a diffracted wave order of the grating, P is a grating period of the grating, λ is a wavelength of the incident light of the grating, γ is an incident angle of the incident light of the grating, and γ' is an emergent angle of the incident light after being diffracted by the grating.

11. The display device according to claim 1, wherein the first substrate is at a light emergent side of the display device, and the display device further comprises a second substrate at a side of the light guide plate away from the first substrate.

12. The display device according to claim 1, wherein the optical component comprises a reflective cover having a partial paraboloid and a gathering cover extending from the reflective cover, a second end portion of the gathering cover is at a vertex of the partial paraboloid of the reflective cover, and a first end portion of the gathering cover away from the reflective cover abuts against the lateral surface of the light guide plate.

13. The display device according to claim 12, wherein the plurality of monochromatic light emitting components is self-illumination components and the plurality of monochromatic light emitting components are arranged, along a direction parallel to the first substrate, at different positions outside a surface of the optical component opposite to the reflective cover and the gathering cover.

14. The display device according to claim 13, wherein the plurality of monochromatic light emitting components comprises a red light emitting component, a green light emitting component and a blue light emitting component, the green light emitting component is at a focal position of the reflective cover, and an incident angle of light emitted by the green light emitting component and incident into the light guide plate is larger than an incident angle of light emitted by the blue light emitting component and incident into the light guide plate and smaller than an incident angle of light emitted by the red light emitting component and incident into the light guide plate.

15. The display device according to claim 13, wherein the plurality of monochromatic light emitting components comprises a red light emitting component, a green light emitting component and a blue light emitting component, a size of each monochromatic light emitting component of the plurality of monochromatic light emitting components is smaller than 200 μm, the green light emitting component is at a focal position of the reflective cover, the red light emitting component is at a position shifted 200 μm from the focal position of the reflective cover in a direction approaching the light guide plate, and the blue light emitting component is at a position shifted 200 μm from the focal position of the reflective cover in a direction departing from the light guide plate.

16. The display device according to claim 12, wherein the reflective cover comprises a reflective cover body and a reflective layer coated on the reflective cover body, the reflective layer is at a side of the reflective cover body away from the plurality of monochromatic light emitting components, and difference between a refractive index of the reflective cover body and a refractive index of the light guide plate is smaller than a selected threshold.

17. The display device according to claim 1, further comprising:

a first alignment layer at a side of the light guide plate facing towards the liquid crystal layer; and a second alignment layer at a side of the first substrate facing towards the liquid crystal layer;

wherein the plurality of gratings is at a side of the first alignment layer facing towards the liquid crystal layer or at a side of the first alignment layer away from the liquid crystal layer.

18. A display method, applied to the display device according to claim 1, the method comprising:

controlling the plurality of monochromatic light emitting components to be lit up at different time stages in a display period of one image frame.

19. The display method according to claim 18, wherein the controlling the plurality of monochromatic light emitting components to be lit up at different time stages in the display period of one image frame comprises:

controlling the plurality of monochromatic light emitting components to be lit up for a same time duration.

20. The display method according to claim 18, wherein the controlling the plurality of monochromatic light emitting components to be lit up at different time stages in the display period of one image frame, comprises:

controlling the plurality of monochromatic light emitting components to be lit up with a same brightness.

* * * * *